United States Patent
Moriyama (10) Patent No.: US 10,402,613 B2
(45) Date of Patent: Sep. 3, 2019

(54) APPARATUS AND METHOD FOR READING BARCODES AND RECORDING MEDIUM

(71) Applicant: CASIO COMPUTER CO., LTD., Shibuya-ku, Tokyo (JP)

(72) Inventor: Teppei Moriyama, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/699,885

(22) Filed: Sep. 8, 2017

(65) Prior Publication Data
US 2018/0114044 A1 Apr. 26, 2018

(30) Foreign Application Priority Data
Oct. 24, 2016 (JP) ................. 2016-207499

(51) Int. Cl.
*G06K 7/14* (2006.01)
*G06K 7/10* (2006.01)

(52) U.S. Cl.
CPC ............. *G06K 7/14* (2013.01); *G06K 7/1091* (2013.01); *G06K 7/10801* (2013.01)

(58) Field of Classification Search
CPC .......................... G06K 7/10861; G06K 7/1413
USPC ... 235/462.01, 375, 462.07, 487, 462.1, 454
See application file for complete search history.

(56) References Cited

U.S. PATENT DOCUMENTS

| | | | |
|---|---|---|---|
| 9,117,129 B1 | 8/2015 | Koch | |
| 2003/0121981 A1* | 7/2003 | Slutsky | G06K 7/10851 235/462.45 |
| 2003/0222150 A1* | 12/2003 | Sato | G06F 1/1626 235/472.02 |
| 2006/0043193 A1* | 3/2006 | Brock | G06K 7/10 235/462.41 |
| 2008/0292141 A1* | 11/2008 | Yu | G06K 9/228 382/106 |
| 2011/0000966 A1* | 1/2011 | Liu | G06K 7/10732 235/462.42 |
| 2012/0181338 A1* | 7/2012 | Gao | G06K 7/12 235/455 |

FOREIGN PATENT DOCUMENTS

JP 06020086 A 1/1994
WO 2007145003 A1 12/2007

OTHER PUBLICATIONS

Japanese Office Action dated May 14, 2019 (and English translation thereof) issued in counterpart Japanese Application No. 2016-207499.

* cited by examiner

*Primary Examiner* — Edwyn Labaze
(74) *Attorney, Agent, or Firm* — Holtz, Holtz & Volek PC (57) ABSTRACT

A barcode reading apparatus has a scanner unit for reading barcodes and a processor for controlling whole operation of the apparatus. The barcode reading apparatus judges whether a distance between a operation unit for receiving an instruction to be given by a user and an operating body such as the finger of the user falls with in a prescribed range, and starts up and brings the scanner unit to a standby state, when it is determined that the distance between the operation unit and the operating body falls with in the prescribed range, and waits for an instruction of making the scanner unit start reading barcodes.

7 Claims, 7 Drawing Sheets

APPARATUS AND METHOD FOR READING BARCODES AND RECORDING MEDIUM

CROSS-REFERENCE TO RELATED APPLICATION

The present application is based upon and claims the benefit of priority from the prior Japanese Patent Application No. 2016-207499, filed Oct. 24, 2016, the entire contents of which are incorporated herein by reference.

BACKGROUND OF THE INVENTION

1. Field of the Invention

The present invention relates to an apparatus and a method for reading barcodes and a recording medium.

2. Description of the Related Art

Barcode reading apparatuses are known, for reading barcodes indicated on a commodity. Some barcode reading apparatus maintains its scanner for reading barcodes in a standby state to prevent power from being uselessly consumed.

For instance, Japanese Unexamined Patent Publication No. Hei06-20086 discloses a barcode reading apparatus which maintains its decoder and lighting unit in a non-operation mode or in a low-level outputting mode during a time period from a time when a user operates a starting switch for starting a reading operation to a time when the barcode reading apparatus touches barcodes. The barcode reading apparatus brings the decoder and lighting unit to an operation mode at a time when the barcode reading apparatus is brought to touch the barcodes.

The above barcode reading apparatus brings the decoder and lighting unit to the operation mode, when the barcode reading apparatus touches the barcodes after the user operates the starting switch. Therefore, in the barcode reading apparatus, power consumption can be reduced but it will take a long time before the reading operation starts.

SUMMARY OF THE INVENTION

According to one aspect of the present invention, there is provided a barcode reading apparatus that comprises a scanner unit which reads barcodes, and a processor which performs functions of (a) judging whether a distance between the barcode reading apparatus and an operating body falls with in a prescribed range, and (b) starting up and bringing the scanner unit to a standby state, when it is determined that the distance between the barcode reading apparatus and the operating body falls with in the prescribed range, and waiting for an instruction to be given by the operating body, of making the scanner unit start reading barcodes.

According to another aspect of the present invention, there is provided a method of reading barcodes in a barcode reading apparatus having a scanner unit, which method comprises steps of (a) judging whether a distance between the barcode reading apparatus and an operating body falls with in a prescribed range, and (b) starting up and bringing the scanner unit to a standby state, when it is determined that the distance between the barcode reading apparatus and the operating body falls with in a prescribed range, and waiting for an instruction to be given by the operating body, of making the scanner unit start operation of reading barcodes.

According to still another aspect of the present invention, there is provided a non-transitory computer-readable recording medium with a program executable by a processor, stored thereon, wherein the processor is mounted on a barcode reading apparatus having a scanner unit, and the program instructs the processor to perform functions of (a) judging whether a distance between the barcode reading apparatus and an operating body falls with in a prescribed range, and (b) starting up and bringing the scanner unit to a standby state, when it is determined that the distance between the barcode reading apparatus and the operating body falls with in a prescribed range, and waiting for an instruction to be given by the operating body, of making the scanner unit start operation of reading barcodes.

BRIEF DESCRIPTION OF THE DRAWINGS

When the following detailed description is read with reference to the accompanying drawings, the present invention will be understood more precisely.

DETAILED DESCRIPTION OF THE PREFERRED EMBODIMENTS

The embodiments of the present invention will be described with reference to the accompanying drawings in detail. The scope of the present invention is by no means restricted to the exemplifications given herein.

Figure 1:
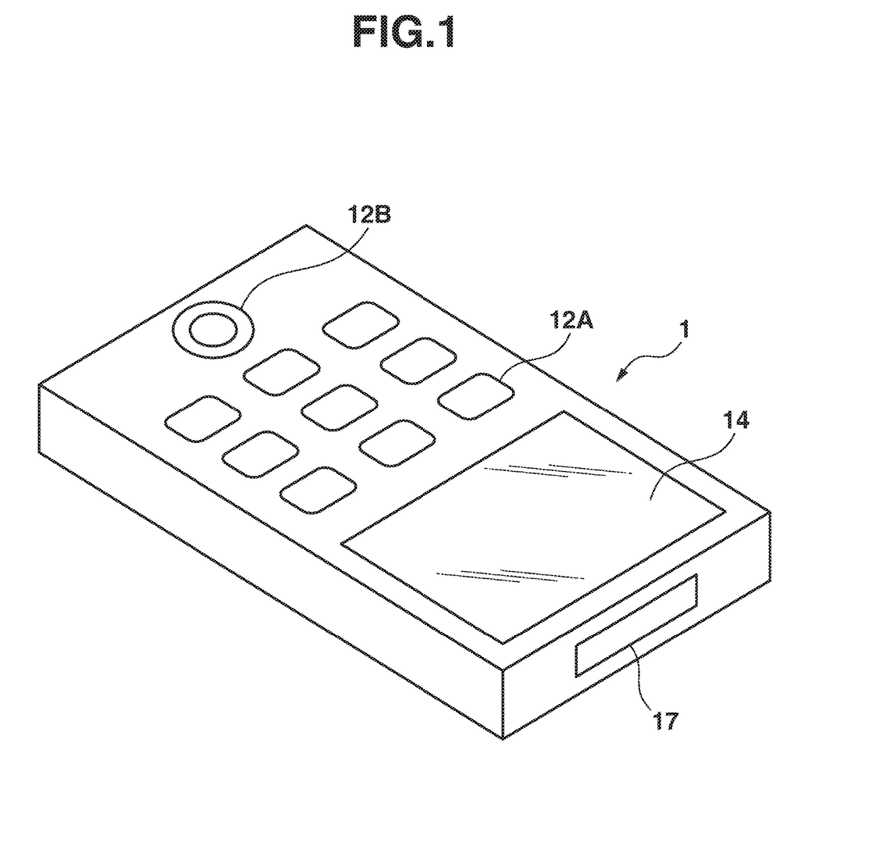
FIG. 1 is a view showing a construction of a handy terminal according to the embodiment of the present invention.

A handy terminal 1 according to the embodiment of present invention will be described with reference to FIG. 1 to FIG. 3. The handy terminal 1 is used as a bar code reading apparatus. A construction of the handy terminal 1 will be described with reference to FIG. 1. FIG. 1 is a view showing the construction of the handy terminal 1.

For example, as illustrated in FIG. 1 the handy terminal 1 is provided with an operation key 12A (operation unit), a trigger key 12B (operation unit), a displaying unit 14 and a scanner unit 17. Further, the handy terminal 1 can be also used as an information terminal such as a smart phone, a tablet PC (Personal Computer), a laptop PC and PDA (Personal Digital Assistance).

The operation key 12A is a key pad for receiving an input operation and is used by a user to perform an input operation to input an instruction. The user performs the input operation to enter numerals and/or characters and to read various functions.

The trigger key 12B is a key pad for receiving a trigger-input of scanned barcodes. While the trigger key 12B is being operated, the scanner unit 17 emits laser light toward barcodes to scan them, as will be described later.

Although as will be described in detail later, a sensor 19 for measuring a distance is provided on the trigger key 12B or is provided in the vicinity of the trigger key 12B. When the user touches the trigger key 12B with his/her finger (or hand) to operate it, the distance measuring sensor 19 detects the user's finger (or hand) approached within a predetermined distance from the trigger key 12B.

The displaying unit 14 consists of LCD (Liquid Crystal Display) or ELD (Electro Luminescent Display), and serves to display information which is necessary for operating the handy terminal 1. Further, the displaying unit 14 can be composed of a tough panel of a pressure sensitive type or an electrostatic type to be used for receiving an input operation.

The scanner unit 17 is a laser scanner for reading an one-dimensional barcode and is provided with a light emitting unit, a light receiving unit, a gain circuit, and a binary processing circuit. More specifically, the light emitting unit of the scanner unit 17 emits light toward the barcodes and the light receiving unit receives the light reflected from the barcodes and converts the received light into an electronic signal. The gain circuit amplifies the electric signal and the binary processing circuit binarizes the electric signal to binary data, whereby the scanner unit 17 outputs the binary data.

As will be described in detail later, the scanner unit 17 is controlled to be either in a rest state, a standby state or in a reading state. In the present embodiment, the scanner unit 17 is controlled in accordance with the user's convenience to be kept in one of the three states, and is allowed to start the barcode reading operation quickly with least power consumption.

A physical configuration of the handy terminal 1 will be described with reference to FIG. 2. FIG. 2 is a view showing the physical configuration of the handy terminal 1.

Figure 2:
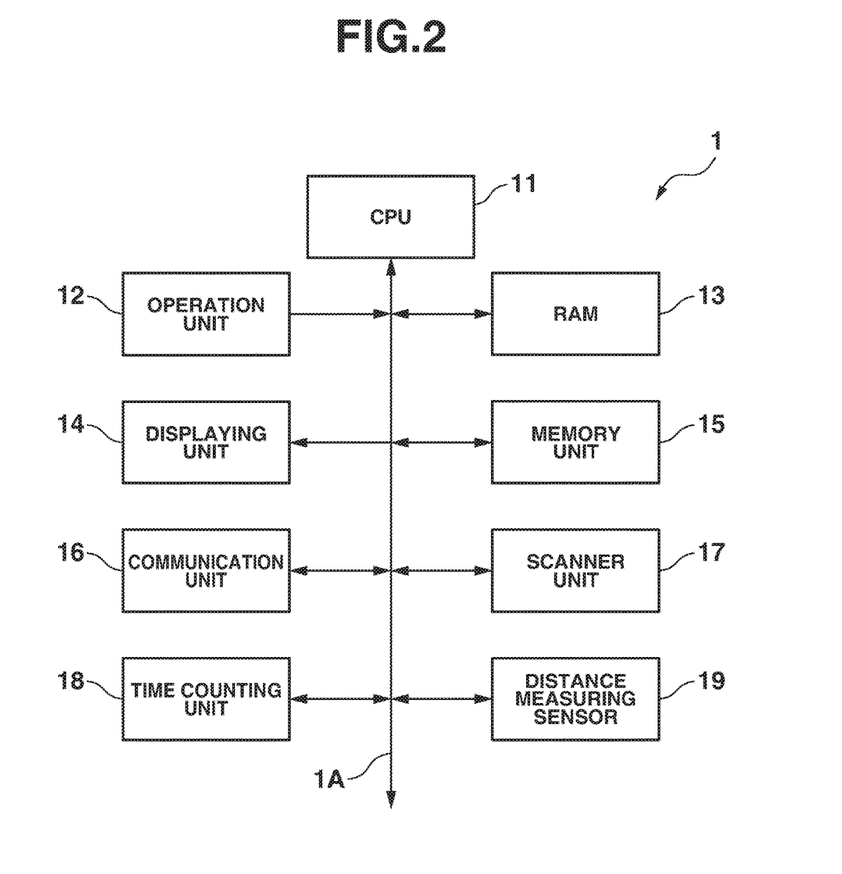
FIG. 2 is a view showing the physical configuration of the handy terminal.

As shown in FIG. 2, the handy terminal 1 comprises CPU (Central Processing Unit) 11, an operation unit 12, RAM (Random Access Memory) 13, the displaying unit 14, a memory unit 15, a communication unit 16, the scanner unit 17, a time counting unit 18, and the distance measuring sensor (measuring unit) 19. These units of the handy terminal 1 are connected to each other through a bus 1A. The displaying unit 14 and the scanner unit 17 have been described above, and therefore further their description will be omitted hereafter. A processor of the handy terminal 1 can be used as the CPU 11.

The CPU 11 serves to control operation of the various units of the handy terminal 1. The CPU 11 reads the designated one out of a system program and application programs stored in the memory unit 15 to the RAM 13, and executes the read program to various processes.

The operation unit 12 includes the operation key 12A and the trigger key 12B. The operation unit 12 also includes a touch panel provided so as to cover the whole surface of the displaying unit 14.

The RAM 13 is a volatile memory for storing information temporarily and has a work area for storing various sorts of data and programs.

The memory unit 15 has a configuration including ROM (Read Only Memory) and a flash memory, and stores various sorts of information such as programs and application programs in addition to the operation system. It is possible for the memory unit 15 to have a configuration including a detachable and portable memory such as an SD card and IC (Integrated Circuit) card. Further, it is possible for the memory unit 15 to include a memory area of a predetermined external server while the memory unit 15 is connected with the external server through a network with the communication function.

The communication unit 16 is provided with an antenna used for radio communication, a modulation unit for modulating a sending signal, and a demodulation unit for demodulating a received signal, and performs radio communication with an access point on a communication network.

The time counting unit 18 is a time piece (clock) for counting a real time. The time counting unit 18 provides the CPU 11 with time information including a date and a time. The time counting unit 18 has a stop-watch function of measuring a lapsed time.

The distance measuring sensor 19 serves to measure a distance between the operation unit 12 and an operating body. For example, in the handy terminal of the present embodiment, the distance measuring sensor 19 measures a distance to the finger of the user who is going to operate the trigger key 12B. The distance measuring sensor 19 uses the principle of measurement in Triangulation and Time of Flight to obtain distance information. A light source in the distance measuring sensor 19 emits light to the operating body and a light receiving element receives the light reflected from the operating body. In the distance measuring sensor 19, the received light is subjected to evaluation and calculation, whereby the received light is converted to distance information representing a distance between the sensor 19 and the operating body. The distance information is supplied to the CPU 11. The distance measuring sensor 19 is not restricted to the above, but a sensor of an electrostatic capacitance type can be used as the distance measuring sensor 19.

In the handy terminal 1 according to the embodiment of the invention, since the distance measuring sensor 19 is provided on the trigger key 12B or in the vicinity of the trigger key 12B, it is preferable to compose the distance measuring sensor 19 from a transparent member or to make it such that the sensor 19 will allow light to pass through it's own body. In the distance measuring sensor 19 made in the above manner, the light can be emitted to the user's finger from the trigger key 12B. Further, the light can be used for enhancing convenience in operation of the handy terminal 1, for improving its external appearance, and for making good use of power in the handy terminal 1.

The functional configuration of the handy terminal 1 will be described with reference to FIG. 3 in detail. FIG. 3 is a view showing a block diagram (functional configuration) of the handy terminal 1.

Figure 3:
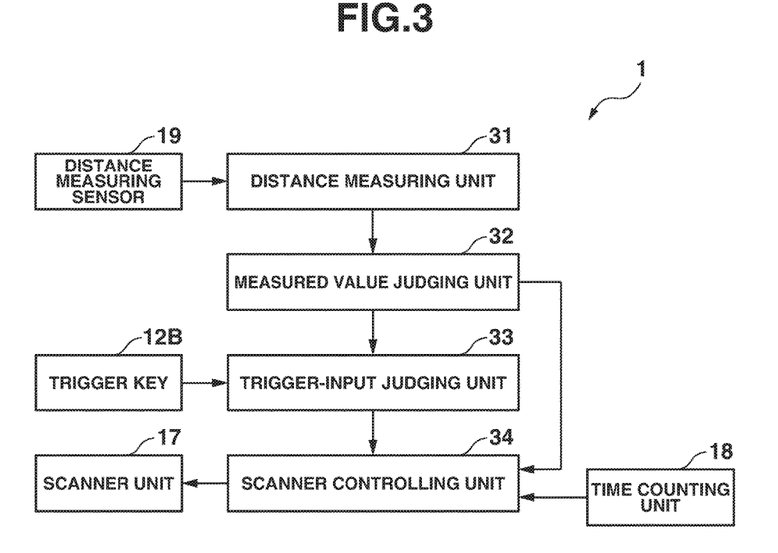
FIG. 3 is a view showing a block diagram (functional configuration) of the handy terminal.

As shown in FIG. 3, the handy terminal 1 comprises a distance measuring unit 31, a measured value judging unit 32, a trigger-input judging unit 33, and a scanner controlling unit 34.

The distance measuring unit 31 uses the distance measuring sensor 19 to measure a distance between the operation unit 12 and the operating body, and supplies the measured distance to the CPU 11. In the present handy terminal 1, a distance between the operation unit 12 and the finger of the user who is going to operate the trigger key 12B is measured and the measured distance is output to the CPU 11.

The measured value judging unit 32 judges whether the distance measured by the distance measuring unit 31 falls within a prescribed range. In the present handy terminal 1, the measured value judging unit 32 judges whether the distance between the operation unit 12 and the finger of the user who is going to operate the trigger key 12B falls within the prescribed range.

The trigger-input judging unit 33 judges whether the user has operated the trigger key 12B.

The scanner controlling unit 34 controls operation of the scanner unit 17 in accordance with outputs from the measured value judging unit 32 and the trigger-input judging unit 33. The controlling operation of the scanner controlling unit 34 will be described with reference to FIG. 4 and the following drawings in detail.

Figure 4:
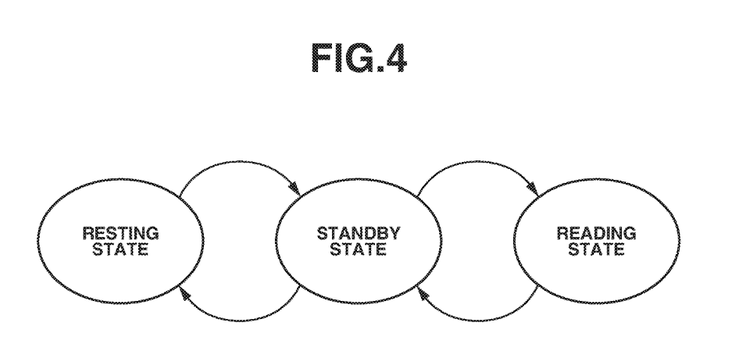
FIG. 4 is a view showing a transition in state of a scanner unit.

Various states in which the scanner unit 17 is kept will be described with reference to FIG. 4 to FIG. 7. Referring to FIG. 4, the state transition of the scanner unit 17 will be described. FIG. 4 is a view showing the transition in state of the scanner unit 17.

As shown in FIG. 4, the scanner unit 17 is controlled to be maintained either in the resting state, the standby state or in the reading state. It is determined based on the outputs of the measured value judging unit 32 and the trigger-input judging unit 33, in which state the scanner unit 17 is maintained.

The resting state of the scanner unit 17 will be described. When the measured value judging unit 32 determines that the distance between the trigger key 12B and the user's finger does not fall within the prescribed range, the scanner unit 17 is controlled to be in the resting state. The scanner unit 17 in the resting state is out of operation and will consume the least power. The handy terminal 1 will take time before the scanner unit 17 in the resting state starts the barcode scanning operation, since it is required to start up the scanner unit 17 to emit laser light.

Figure 5:
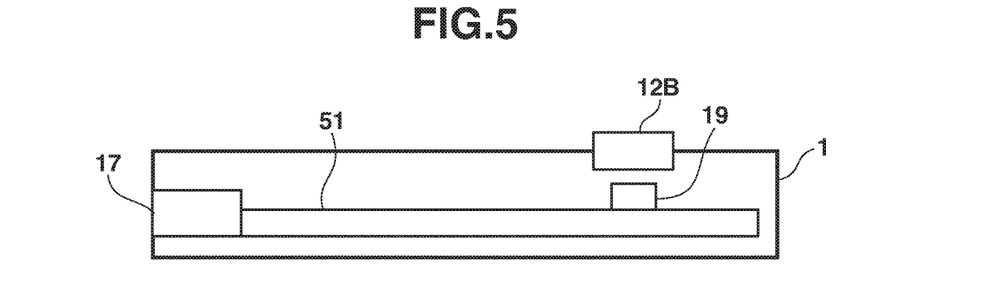
FIG. 5 is a view showing the handy terminal with the scanner unit maintained in a resting state.

FIG. 5 is a view showing the handy terminal 1 with the scanner unit 17 maintained in the resting state. FIG. 5 is a cross-sectional view of the handy terminal 1, which illustrates the scanner unit 17 and the distance measuring sensor 19 mounted on a substrate 51. For simplicity, the displaying unit 14 and the operation key 12A are omitted therefrom.

In the handy terminal 1 shown in FIG. 5, the trigger key 12B is not operated and no operating body has been detected within a prescribed range defined based on the position of the distance measuring sensor 19. More specifically, the measured value judging unit 32 determines that the distance between the trigger key 12B and the user's finger does not fall within the prescribed range. Therefore, the scanner unit 17 is not driven and maintained in the resting state.

The standby state of the scanner unit 17 will be described with reference to FIG. 4. When the user does not operate the trigger key 12B but the measured value judging unit 32 determines that the distance between the trigger key 12B and the user's finger falls within the prescribed range, the scanner unit 17 is controlled to be in the standby state. The scanner unit 17 in the standby state is driven but does not emit laser light. The power will be saved by an amount corresponding to power consumption required for emitting laser light.

Figure 6:
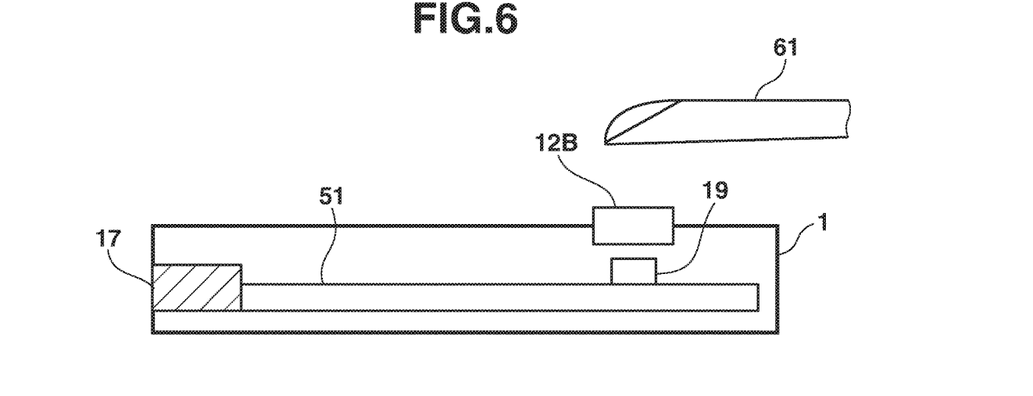
FIG. 6 is a view showing the handy terminal with the scanner unit maintained in a standby state.

FIG. 6 is a view showing the handy terminal 1 with the scanner unit 17 maintained in the standby state. In the handy terminal 1 shown in FIG. 6, the trigger key 12B is not operated by the user but an operating body (the user's finger 61) has been detected within the prescribed range defined based on the position of the distance measuring sensor 19. More specifically, the measured value judging unit 32 determines that the distance between the trigger key 12B and the user's finger 61 falls within the prescribed range. Therefore, the scanner unit 17 is driven and kept in the standby state, in which no laser light is emitted.

The reading state of the scanner unit 17 will be described with reference to FIG. 4. When it is determined that the user operates the trigger key 12B, the scanner unit 17 is controlled to be in the reading state. The scanner unit 17 in the reading state is driven to emit laser light. The power is consumed for emitting laser light to read barcodes.

Figure 7:
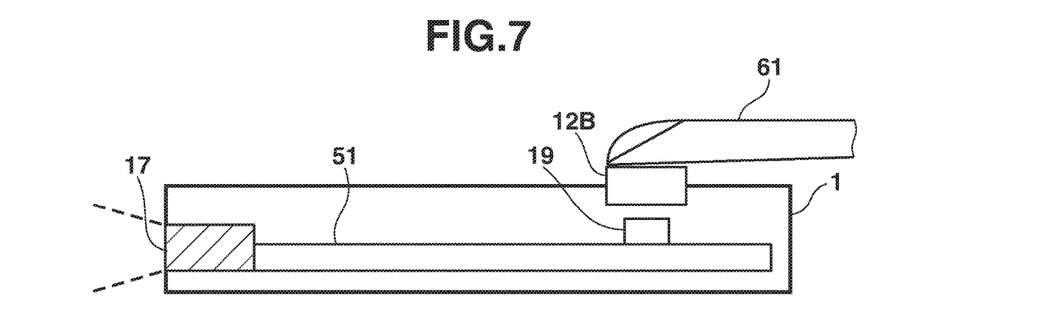
FIG. 7 is a view showing the handy terminal with the scanner unit maintained in a reading state.

FIG. 7 is a view showing the handy terminal 1 with the scanner unit 17 maintained in the reading state. As shown in FIG. 7, the user operates the trigger key 12B of the handy terminal 1 with his/her finger 61. Therefore, the scanner unit 17 is driven to emit laser light, in other words, the scanner unit 17 is in the reading state.

Figure 8:
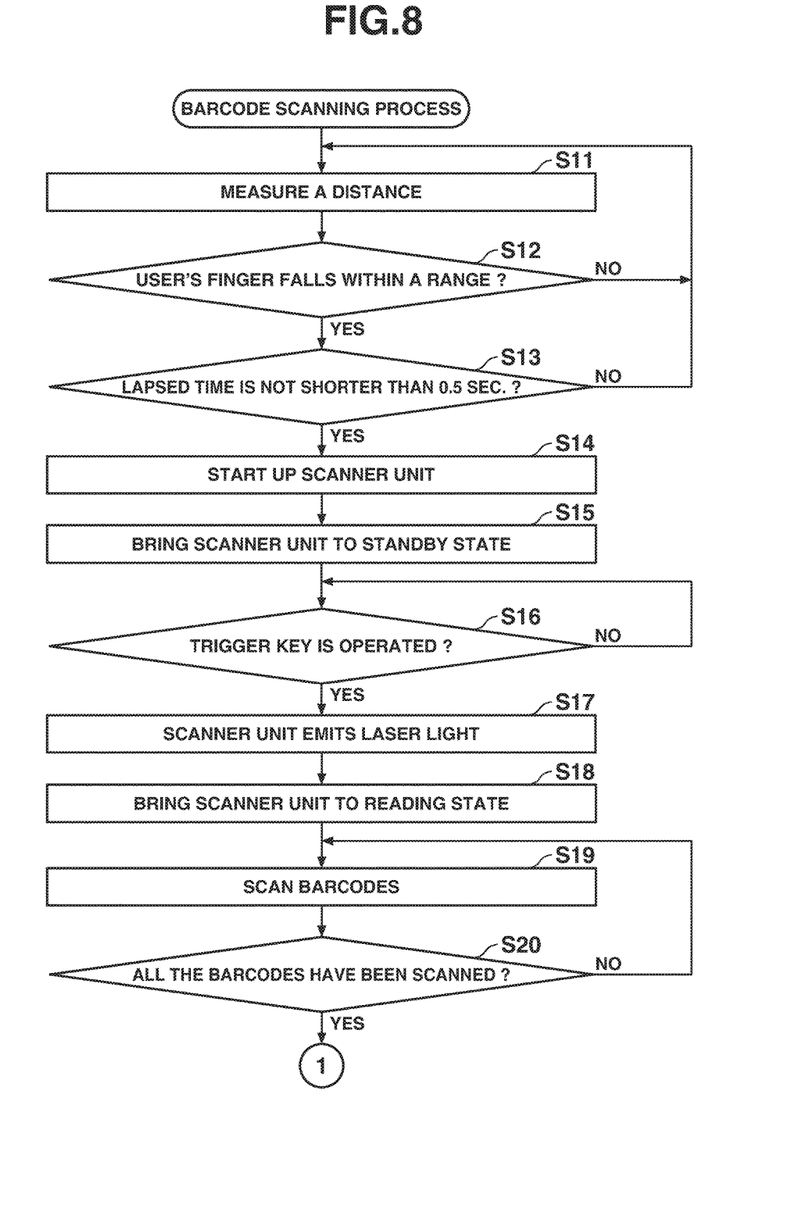
FIG. 8 is a flow chart (1) of a process of scanning barcodes.
Figure 9:
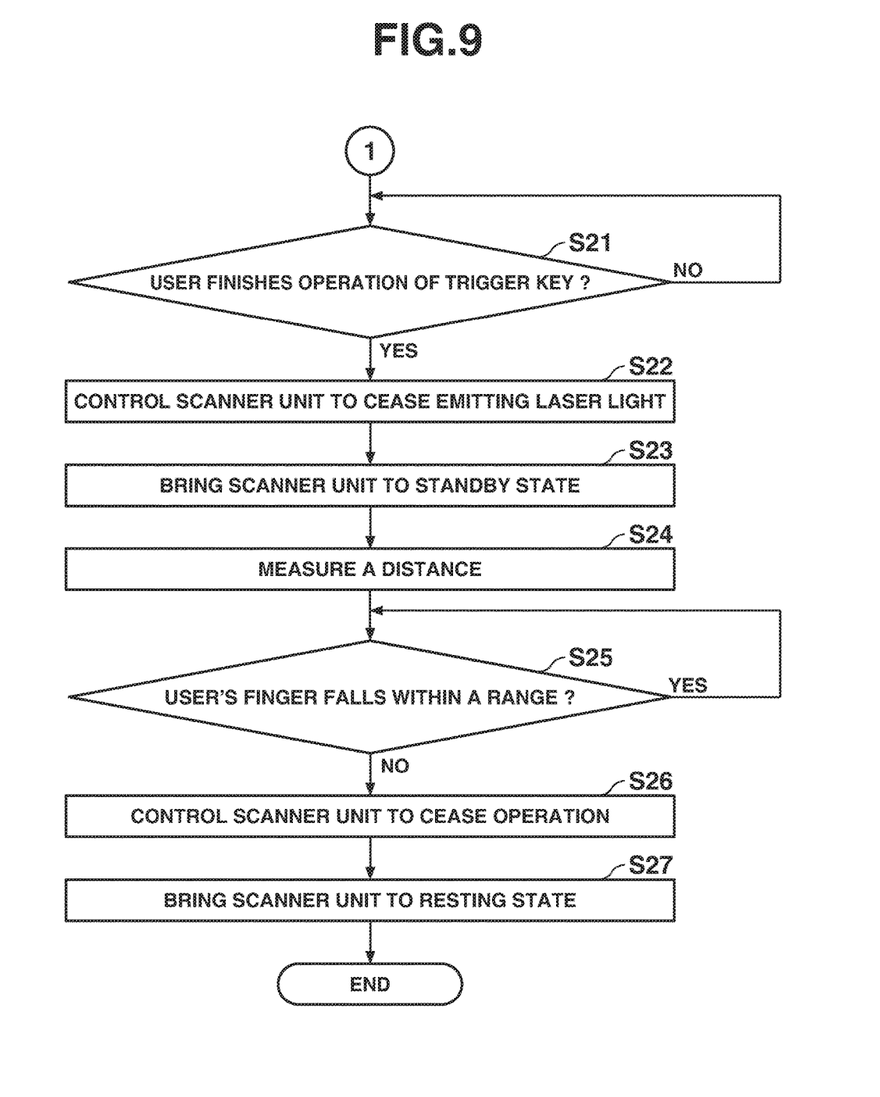
FIG. 9 is a flow chart (2) of the process of scanning barcodes.

A process of scanning barcodes will be described with reference to FIG. 8 and FIG. 9. FIG. 8 and FIG. 9 are flow charts of the process of scanning barcodes.

The distance measuring unit 31 measures a distance between the operation unit 12 and the operating body (for example, user's finger or hand) based on information output from the distance measuring sensor 19 (step S11 in FIG. 8).

The measured value judging unit 32 judges whether the distance between the operation unit 12 and the user's finger 61, measured by the distance measuring unit 31, falls within the prescribed range (step S12). When it is determined that the distance between the operation unit 12 and the user's finger 61 falls within the prescribed range (YES at step S12), the time counting unit 18 starts counting a lapsed time and supplies the counted lapsed time to the scanner controlling unit 34. The scanner controlling unit 34 judges whether the lapsed time output from the time counting unit 18 is not shorter than 0.5 seconds (step S13).

For instance, when the user's finger 61 has come in the prescribed range even though the user does not want to scan barcodes, it will be possible to prevent the scanner unit 17 from being driven. Although it is judged at step S13 whether the lapsed time is not shorter than 0.5 seconds, but the lapsed time may be set to another value appropriately. Further, the process at step S13 can be omitted. In the flow chart of FIG. 8, with the process of step S13 omitted, when it is determined that the distance between the operation unit 12 and the user's finger 61 falls within the prescribed range (YES at step S12), the process advances to step S14.

When the distance between the operation unit 12 and the user's finger 61 falls within the prescribed range (YES at step S12) and more than 0.5 seconds have lapsed (YES at step S13), then the scanner controlling unit 34 starts up the scanner unit 17 (step S14) and brings the scanner unit 17 to the standby state (step S15). Therefore, even though the user does not operate the trigger key 12B, when it is detected that the user's finger 61 has come close the trigger key 12B, the scanner unit 17 will be driven.

When the scanner unit 17 is in the standby state and the measured value judging unit 32t determines that the distance between the operation unit 12 and the user's finger 61 has deviated from the prescribed range (NO at step S12), the scanner controlling unit 34 ceases driving the scanner unit 17, bringing the scanner unit 17 to the resting state, that is, returning to step S11.

After bringing the scanner unit 17 to the standby state, the CPU 11 judges whether the trigger key 19 has been operated by the user (step S16). In other words, the CPU 11 works as the trigger-input judging unit 33.

When it is determined that the trigger key 19 has not been operated by the user (NO at step S16), the CPU 11 repeatedly performs the process at step S16 and the scanner unit 17 stays in the standby state, until the trigger key 12B will be operated by the user. Meanwhile, when it is determined that the trigger key 19 has been operated by the user (YES at step S16), the CPU 11 controls the scanner unit 17 to emit laser light (step S17), bringing the scanner unit 17 to the reading state (step S18). In other words, the CPU 11 performs the function of the scanner controlling unit 34.

When the scanner unit 17 is brought to the reading state, it is possible for the scanner unit 17 to scan barcodes by making the scanner unit 17 emit laser light toward the barcodes which the user wants to read (step S19).

When the scanner unit 17 in the reading state has scanned all the barcodes which the user wants to read (YES at step S20), the CPU 11 judges whether the user has finished operation of the trigger key 12B (step S21 in FIG. 9). In other words, the CPU 11 performs the function of the trigger-input judging unit 33.

When it is determined that the user has finished operation of the trigger key 12B (YES at step S21), the CPU 11 controls the scanner unit 17 to cease emitting laser light (step S22), bringing the scanner unit 17 to the standby state (step S23). Meanwhile, when it is determined that the user has not finished operation of the trigger key 12B (NO at step S21), the CPU 11 repeatedly performs the process at step S21 until the user will finish operation of the trigger key 12B. In other words, the CPU 11 performs the function of the scanner controlling unit 34.

When the scanner unit 17 has been brought to the standby state (step S23), the CPU 11 instructs the distance measuring sensor 19 to measure a distance from the operation unit 12 to the user's finger 61 (step S24). In other words, the CPU 11 performs the function of the distance measuring unit 31. Further, the CPU 11 judges whether the distance between the operation unit 12 and the user's finger 61 falls within the prescribed range (step S25). In other words, the CPU 11 works as the measured value judging unit 32.

When it is determined that the distance between the operation unit 12 and the user's finger 61 does not fall within the prescribed range (NO at step S25), the CPU 11 controls the scanner unit 17 to cease its operation (step S26), bringing the scanner unit 15 to the resting state (step S27), and finishes the process of scanning barcodes. Meanwhile, when it is determined that the distance between the operation unit 12 and the user's finger 61 falls within the prescribed range (YES at step S25), the CPU 11 repeatedly performs the process at step S25 until it will be determined that the distance between the operation 12 and the user's finger 61 does not fall within the prescribed range. In other words, the CPU 11 performs the function of the scanner controlling unit 34.

Figure 10:
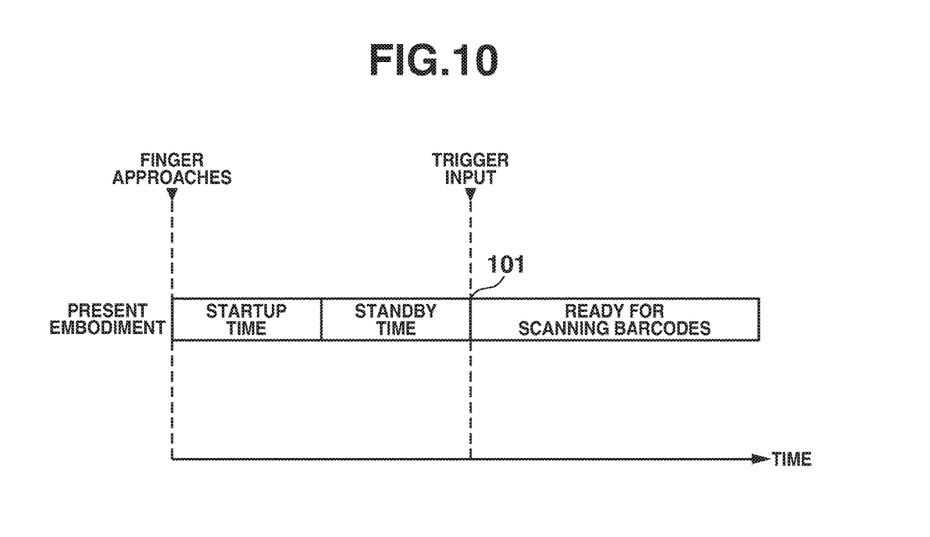
FIG. 10 is a view for explaining a time period needed before a scanning operation starts in the handy terminal.

Effects of the handy terminal 1 will be described with reference to FIG. 10 and FIG. 11. Referring to FIG. 10, a time of starting a reading operation by the handy terminal 1 will be described.

When the handy terminal 1 according to the present embodiment of the invention scans barcodes, upon confirmation by the distance measuring sensor 19 that the user's finger 61 has come close, the CPU 11 starts up the scanner unit 17 to bring the unit 17 to the standby state, as shown in FIG. 10. Therefore, the scanner unit 17 is maintained in the standby state after the scanner unit 17 has been driven until the trigger key 12B is operated. The time period in which the scanner unit 17 is maintained in the standby state is indicated as a "standby period" in FIG. 10.

At the time when the trigger key 12B is operated the scanner unit 17 emits laser light and comes in the reading state, in which the scanner unit 17 can scan barcodes. Since the scanner unit 12 has been driven and is in the standby state at the time when the trigger key 12B is operated, there is no need for the scanner unit 17 to wait for by the "startup time". Therefore, at the time of 101 in FIG. 10 the scanner unit 17 has been ready for performing operation of scanning barcodes.

As described above, the handy terminal 1 according to the present embodiment of the invention can start barcode-reading operation in a comparably short time.

The reading state and the standby state of a device for reading barcodes will be described with reference to FIG. 11.

Figure 11:
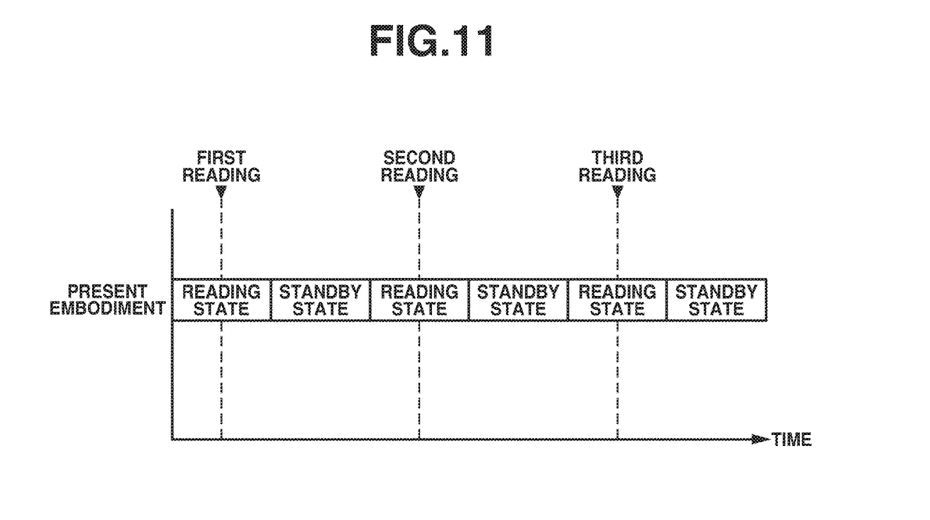
FIG. 11 is a view for explaining a resting state, standby state and a reading state in the handy terminal.

FIG. 11 is a view showing a state transition of a barcode scanner which scans barcodes (for instance, three barcodes). When the handy terminal 1 according to the present embodiment of the invention reads three barcodes as shown in FIG. 11, it is possible to keep the scanner unit 17 in the standby state by interrupting operation of the trigger key 12B while the handy terminal 1 is scanning barcodes. More specifically, the scanner unit 17 emits laser light only while the handy terminal 1 is scanning barcodes. Meanwhile, even though the scanner unit 17 is driven but no laser light is emitted.

In the handy terminal 1 according to the embodiment of the invention, the scanner unit 17 is controlled to be in the resting state, the standby state, or in the reading state, and the scanner unit 17 emits laser light only when needed. Therefore, power consumption can be reduced in the handy terminal 1.

The handy terminal 1 according to the embodiment of the invention judges whether a distance between the operation unit 12 and the operating body falls within a prescribed range, and drives and brings the scanner unit 17 to the standby state for receiving a trigger-input to perform a barcode scanning operation, when it is determined that the distance between the operation unit 12 and the operating body falls within a prescribed range. In other words, this means that the handy terminal 1 has judging means and controlling means.

As described above, the handy terminal 1 realizes a barcode reading device and program which consume less power and can start the barcode reading operation in a short time.

Further, the handy terminal 1 judges whether a distance between the trigger key 12B for receiving the trigger-input and the operating body falls within the prescribed range. Therefore the handy terminal 1 can drive the barcode scanner before the user operates the trigger key 12B.

When the operating body moves away from the prescribed range, while the handy terminal 1 is driving the barcode scanner upon confirming that the distance to the operating body falls within the prescribed range, the handy terminal 1 ceases driving the barcode scanner. Therefore, it is possible to use the scanner unit 117 only when needed.

The handy terminal 1 counts a lapsed time after the time when it is determined that the distance to the operating body falls within the prescribed range, and drives and brings the scanner unit 17 to the standby state for receiving a trigger-input, when the lapsed time has reached a prescribed time period. Therefore, it is possible to prevent the scanner unit 17 from being driven independently of the user's intention.

Although specific embodiments of the invention have been described in the foregoing detailed description, it will be understood that the invention is not limited to the particular embodiments described herein, but modifications and rearrangements may be made to the disclosed embodiments.

The embodiment of the invention has been explained with a specific example using the user's finger as the operating body, wherein the distance measuring sensor 19 measures a distance between the trigger key 12B and the user's finger, but other part of the user in place of his/her finger can be used. Further, other device can be used in place of the distance measuring sensor 19 to measure the distance.

In the embodiment of the invention, the scanner unit 17 is controlled to be maintained in three states: the resting state, the standby state and the reading state. The states in which the scanner unit 17 is controlled to be maintained are not restricted to the above three states. It is possible to control the scanner unit 17 based on a distance measured by the distance measuring sensor 19, to which state the scanner unit 17 is brought, the resting state, the standby state or the reading state.

In the embodiment of the invention, the distance measuring sensor 19 measures a distance between the operation unit 12 and the operating body to judge whether the distance falls within the prescribed range. When a photoelectric sensor for detecting the operating body is used, there will be no need for the distance measuring sensor 19 to measure the distance to control the scanner unit 17.

In the embodiment of the invention, the distance measuring sensor 19 is mounted on the substrate 51 just below the trigger key 12B (FIG. 5 to FIG. 7), but the distance measuring sensor 19 may be provided on other position.

It is possible to realize the unit having CPU 11, RAM 13, and the memory unit 15, for performing the process of scanning barcodes, by using an average computer system in place of a specific system. For example, a computer readable recording medium such as a flexible disk drive, CD-ROM and DVD-ROM, with a computer program for performing the above process, stored thereon, is distributed, and the program, when installed on a computer, instructs the computer to perform the process of scanning barcodes. In this way, the unit for performing the process of scanning barcodes may be realized by the average computer system. It is possible to store the computer program for performing the process of scanning barcodes on a storing device provided in a server apparatus on the Internet such as a communication network and to allow a general computer system to download the computer program and to make the computer system to perform the process of scanning barcodes. Also in this fashion, the unit for performing the process of scanning barcodes may be realized by the general computer system.

When a function of the above unit for performing the process of scanning barcodes is shared by OS (operating system) and an application program, and is realized by cooperation of the OS and the application program, it may be possible to store only the application program in the recording medium and the storing device.

Further, it is possible to deliver the computer program through the communication network. For example, it is possible to put up the computer program on a notice board of the communication network to deliver the computer program through the network. The computer executes the delivered computer program under operation of the OS, thereby performing the process for scanning barcodes.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. A barcode reading apparatus comprising:
a scanner unit which reads barcodes;
a trigger key which is operable to make the scanner unit start reading a barcode; and
a processor which performs processes including:
a detecting process for detecting whether the trigger key is kept in an operation state or out of the operation state;
a judging process for judging whether an operating body capable of operating the trigger key falls within a prescribed distance from the trigger key, while it is determined in the detecting process that the trigger key is kept out of the operation state; and
a scanner controlling process for controlling the scanner unit to be in one of (i) a rest state, (ii) a standby state, and (iii) a reading state,
wherein:
in the scanner controlling process, while it is determined in the detecting process that the trigger key is kept in the operation state, the processor controls the scanner unit to be in the reading state,
in the scanner controlling process, when it is judged in the judging process that the operating body falls within the prescribed distance from the trigger key while it is determined in the detecting process that the trigger key is kept out of the operation state, the processor controls the scanner unit to be in the standby state, and
in the scanner controlling process, when it is judged in the judging process that the operating body does not fall within the prescribed distance from the trigger key while it is determined in the detecting process that the trigger key is kept out of the operation state, the processor controls the scanner unit to be in the rest state.

2. The barcode reading apparatus according to claim 1, wherein:
the processor further performs a time counting process to count a time duration lapsed after it has been judged in the judging process that the operating body falls within the prescribed distance from the trigger key, and
in the scanner controlling process, the processor (i) controls the scanner unit to be in the standby state, when the lapsed time duration counted in the time counting process is longer than a prescribed time duration, and (ii) controls the scanner unit to be in the rest state, when the lapsed time duration counted in the time counting process is not longer than the prescribed time duration.

3. The barcode reading apparatus according to claim 1, wherein the scanner unit consumes more power in the reading state than in the standby state, and the scanner unit consumes more power in the standby state than in the rest state.

4. The barcode reading apparatus according to claim 1, wherein:
the scanner unit is a laser scanner provided with a light emitting source,
in the rest state, the laser scanner is not driven;
in the standby state, the laser scanner is driven and the light emitting source does not emit light; and
in the reading state, the laser scanner is driven and the light emitting source emits light.

5. The barcode reading apparatus according to claim 1, wherein a finger or a hand of a user of the barcode reading apparatus serves as the operating body.

6. A method of controlling a barcode reading apparatus which has a scanner unit for reading a barcode and a trigger key which is operable to make the scanner unit start reading a barcode, the method comprising:

detecting whether the trigger key is kept in an operation state or out of the operation state;

judging whether an operating body capable of operating the trigger key falls within a prescribed distance from the trigger key, while it is determined in the detecting that the trigger key is kept out of the operation state; and performing a scanner controlling process for controlling the scanner unit to be in one of (i) a rest state, (ii) a standby state, and (iii) a reading state, wherein:

in the scanner controlling process, while it is determined in the detecting that the trigger key is kept in the operation state, the scanner unit is controlled to be in the reading state, in the scanner controlling process, when it is judged that the operating body falls within the prescribed distance from the trigger key while it is determined in the detecting that the trigger key is kept out of the operation state, the scanner unit is controlled to be in the standby state, and in the scanner controlling process, when it is judged that the operating body does not fall within the prescribed distance from the trigger key while it is determined in the detecting that the trigger key is kept out of the operation state, the scanner unit is controlled to be in the rest state.

7. A non-transitory computer-readable recording medium having stored thereon a program that is executable by a processor, wherein the processor is provided in a barcode reading apparatus having a scanner unit for reading a barcode, and a trigger key that is operable to make the scanner unit start reading a barcode, the program being executable by the processor to control the processor to perform processes comprising:

a detecting process for detecting whether the trigger key is kept in an operation state or out of the operation state;

a judging process for judging whether an operating body capable of operating the trigger key falls within a prescribed distance from the trigger key, while it is determined in the detecting process that the trigger key is kept out of the operation state; and a scanner controlling process for controlling the scanner unit to be in one of (i) a rest state, (ii) a standby state, and (iii) a reading state, wherein:

in the scanner controlling process, while it is determined in the detecting process that the trigger key is kept in the operation state, the scanner unit is controlled to be in the reading state, in the scanner controlling process, when it is judged in the judging process that the operating body falls within the prescribed distance from the trigger key while it is determined in the detecting process that the trigger key is kept out of the operation state, the scanner unit is controlled to be in the standby state, and in the scanner controlling process, when it is judged in the judging process that the operating body does not fall within the prescribed distance from the trigger key while it is determined in the detecting process that the trigger key is kept out of the operation state, the scanner unit is controlled to be in the rest state.

* * * * *